United States Patent [19]

Cooke et al.

[11] 4,340,974

[45] Jul. 20, 1982

[54] LOCAL OSCILLATOR FREQUENCY DRIFT COMPENSATION CIRCUIT

[75] Inventors: Billy O. Cooke, Selly Oak; Philip N. Nield, Wythall, both of England

[73] Assignee: Eddystone Radio Limited, Chelmsford, England

[21] Appl. No.: 236,984

[22] Filed: Feb. 23, 1981

Related U.S. Application Data

[63] Continuation of Ser. No. 102,759, Dec. 12, 1979, abandoned, which is a continuation-in-part of Ser. No. 1,608, Jan. 8, 1979, abandoned, which is a continuation of Ser. No. 798,875, May 20, 1977, abandoned.

[30] Foreign Application Priority Data

May 22, 1976 [GB] United Kingdom .............. 21292/76

[51] Int. Cl.³ .............................................. H04B 1/26
[52] U.S. Cl. .................................... 455/258; 455/316; 331/22; 331/31
[58] Field of Search ............... 455/185, 196, 207, 208, 455/209, 314, 315, 316, 258, 265, 260, 184; 331/2, 18, 22, 25, 31

[56] References Cited

U.S. PATENT DOCUMENTS

| | | | |
|---|---|---|---|
| 3,001,068 | 9/1961 | Morita et al. ....................... | 455/208 |
| 3,584,305 | 6/1971 | Leostic ................................ | 455/316 |
| 3,761,835 | 9/1973 | Cook .................................... | 331/1 A |
| 3,806,826 | 4/1974 | Schlosser ............................ | 331/1 A |
| 3,922,609 | 11/1975 | Grohmann .......................... | 331/1 A |
| 4,004,232 | 1/1977 | Amaya ................................. | 455/184 |

Primary Examiner—Jin F. Ng
Attorney, Agent, or Firm—Diller, Ramik & Wight

[57] ABSTRACT

The invention provides a double superheterodyne receiver having the usual first and second frequency changers associated with first and second local oscillators. The second local oscillator is provided as a voltage controlled oscillator and means are provided for determining the difference frequency between the two local oscillators to produce a control signal which is applied to the second local oscillator to tend to maintain the difference frequency constant.

1 Claim, 3 Drawing Figures

LOCAL OSCILLATOR FREQUENCY DRIFT COMPENSATION CIRCUIT

This application is a Rule 60 continuation of Ser. No. 102,759 filed Dec. 12, 1979, which is a continuation-in-part of my copending application Ser. No. 001,608, filed Jan. 8, 1979, which is a Rule 60 continuation of Ser. No. 798,875, filed May 20, 1977; Ser. Nos. 001,608 and 798,875 and 102,759 are now abandoned.

This invention relates to superheterodyne receivers and more specifically to superheterodyne receivers having a plurality of frequency changing stages.

As is well known, it is important, particularly for a communications receiver, that the frequency stability of the receiver be of a relatively high order.

Hitherto, in order to obtain a high order of frequency stability, the local oscillator frequencies in a receiver having a plurality of frequency changing stages have been generated by crystal oscillators or by means of a frequency synthesiser. Whilst the use of a frequency synthesiser results in a high order of stability, such devices are complex and expensive and, furthermore, tend to include a noise component in their outputs which can result in a deterioration of receiver performance.

In order to avoid the use of a frequency synthesiser it is known to store the frequency to which the receiver is first tuned and to regularly measure the frequency to which the receiver is tuned and compare the measured values with the stored value in order to provide a difference signal which may be used to correct for receiver frequency drift by applying a correction voltage to a variable capacitance diode acting on the local oscillator controlled by the main tuning capacitor. However, unless the tuning range of the receiver is narrow such systems present serious design problems in so far as the effect of the variable capacitance diode varies inversely with the tuning capacitance across which it is connected and, particularly for the ranges normally used in H.F. communication receivers, this results in a large variation in the gain of the control loop over the tuning range. As a result if the loop gain is adjusted for optimum response at high frequencies in the range, then at lower frequencies response is over damped and the time required to achieve correction is considerably extended.

The present invention seeks to provide an improved superheterodyne receiver in which the above difficulties are reduced.

According to this invention a superheterodyne receiver having a plurality of local oscillators each associated with a frequency changer comprises means for determining the difference frequency between two of said oscillators to provide a control signal and means for utilising said control signal to control one of said oscillators so as to tend to maintain said difference constant.

Where said receiver is a double superheterodyne receiver, said two oscillators are the first and second local oscillators and the local oscillator to which such control is applied is said second oscillator. Normally, in this case, said second oscillator is provided to be a voltage controlled oscillator.

Preferably a first store is provided to receive a count corresponding to the frequency of said first oscillator, a second store is provided to receive a count corresponding to the frequency of said second oscillator, means are provided for subtractively adding the count of said second store and the count of said first store and for transferring the resultant to a third store and means are provided for subsequently transferring the count of said third store into said first store, applying a count corresponding to the frequency of said first oscillator into said first store and a count corresponding to the frequency of said second oscillator into said second store, subtractively adding the count then in said second store to the count then in said first store and transferring the remainder to a fourth store whose output is utilised to generate said control signal.

Preferably the timing of the transference functions in the arrangement above described is such that the count in said fourth store indicates the average error in the frequency difference between the said first and second local oscillators occurring during a preceding interval of one second.

One example of a superheterodyne receiver, in this case a double superheterodyne receiver, is described with reference to the accompanying drawings in which.

Figure 1:
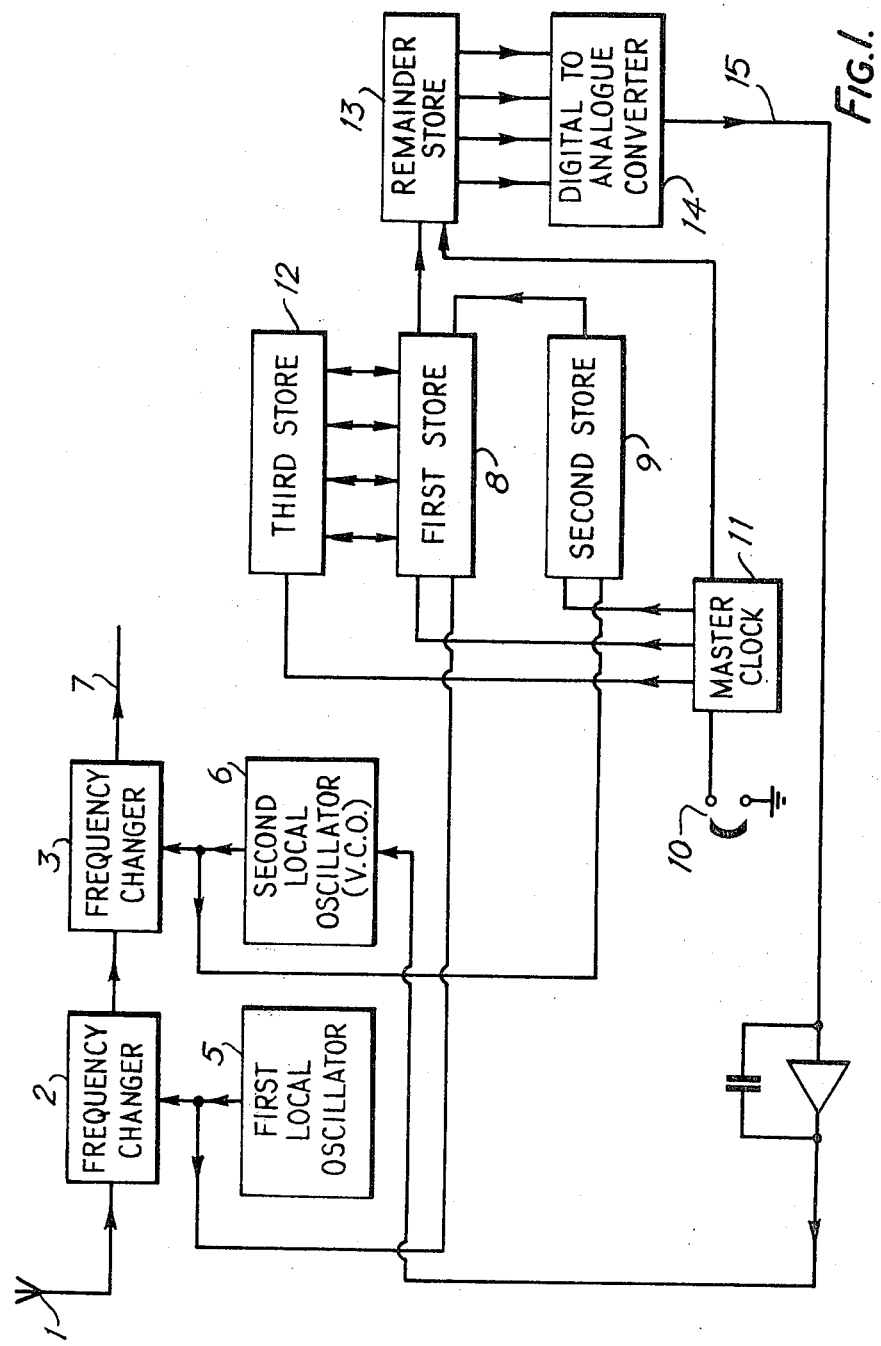
FIG. 1 is a diagrammatic view illustrating the invention.

Referring to FIG. 1, the superheterodyne receiver comprises an aerial 1 connected to supply R.F. signals to two frequency changers referenced 2 and 3 connected in series. Each frequency changer is supplied with signals from a local oscillator, the first being referenced 5 and the second referenced 6. At the output of frequency changer 3 will appear signals at the final intermediate frequency. These are passed for further processing including detection, over lead 7. To simplify the illustration, radio frequency amplifiers, intermediate frequency amplifiers and the like have been omitted. As so far described the receiver is as well known per se.

The signal frequency $f_s$ to which the receiver is tuned equals $f_1-f_2-f_3$, where $f_1$ equals the frequency of the first oscillator 5, $f_2$ equals the frequency of the second oscillator 6 and $f_3$ is the final intermediate frequency applied to lead 7. In a typical case, $f_s$ equals 3.1 MHz, $f_1$ equals 4.45 MHz, $f_2$ equals 1.25 MHz, and $f_3$ equals 0.1 MHz.

Part of the output of local oscillator 5 is applied to a first store 8, whilst part of the output of second local oscillator 6 is applied to a second store 9. Under the control of a "lock" button 10, operated when the receiver is satisfactorily tuned, a master clock 11 controls the transference of the count of second store 9 to first store 8 where the two counts subtractively add. The remainder is transferred into a third store 12.

Under the control of master clock 11, a predetermined period of time later, the remainder stored in third store 12 is transferred back to first store 8 and a count corresponding to the current frequency output of the first oscillator 5 is again applied to first store 8, whilst a count corresponding to the current frequency output of the second local oscillator 6 is again applied to second store 9. Under the control of master clock 11 the count of said second store 9 is then transferred to first store 8 subtractively to add to the count therein. The remainder is transferred to a fourth, remainder, store 13 which is connected in parallel fashion to a digital-to-analogue converter 14 which provides an output which is connected via lead 15 to the second local oscillator 6 (which is provided in the form of a voltage controlled oscillator) so as to control the tuning thereof in such manner as to tend to maintain the difference, as represented by the count in the remainder store 13, between the frequencies of the first local oscillator 5 and the second local oscillator 6, constant.

Figure 2:
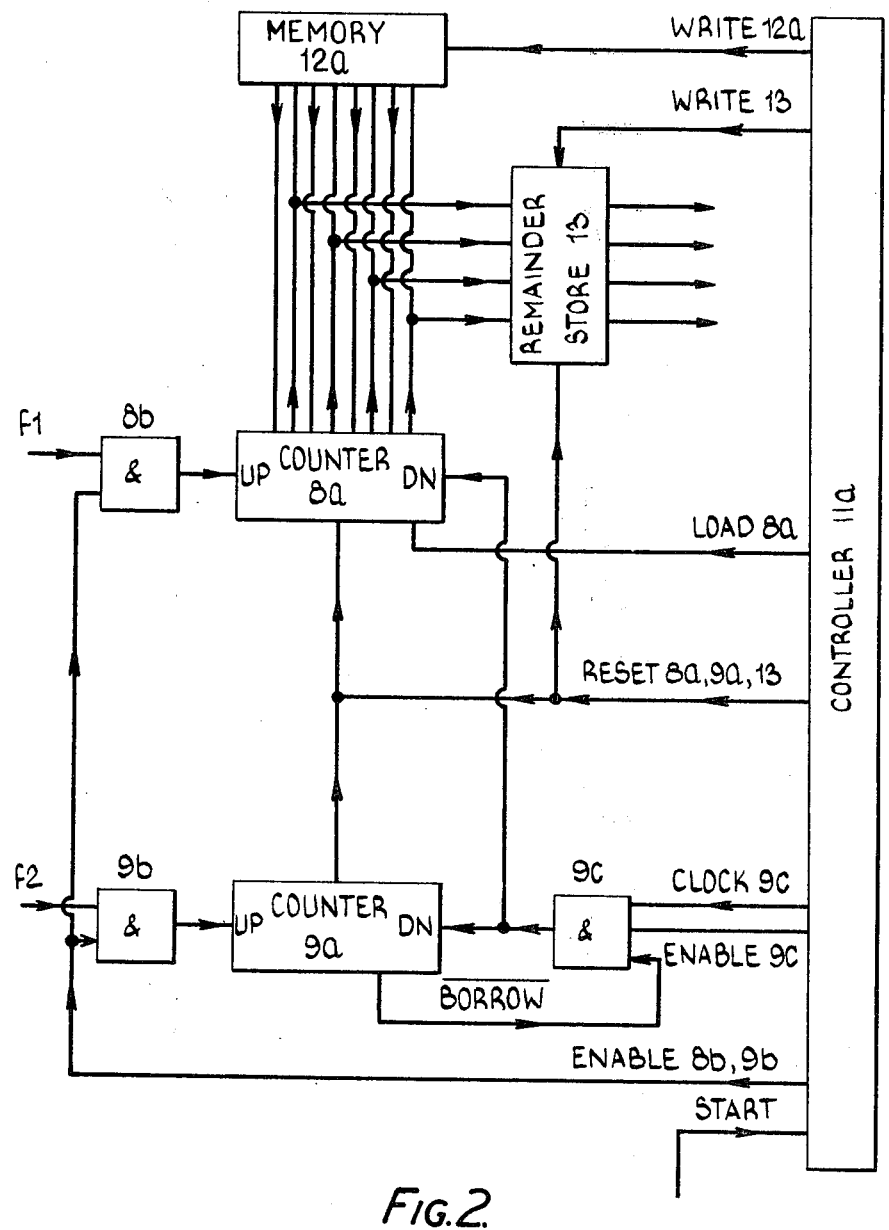
FIG. 2 is a detailed diagram illustrating a specific embodiment of the invention.
Figure 3:
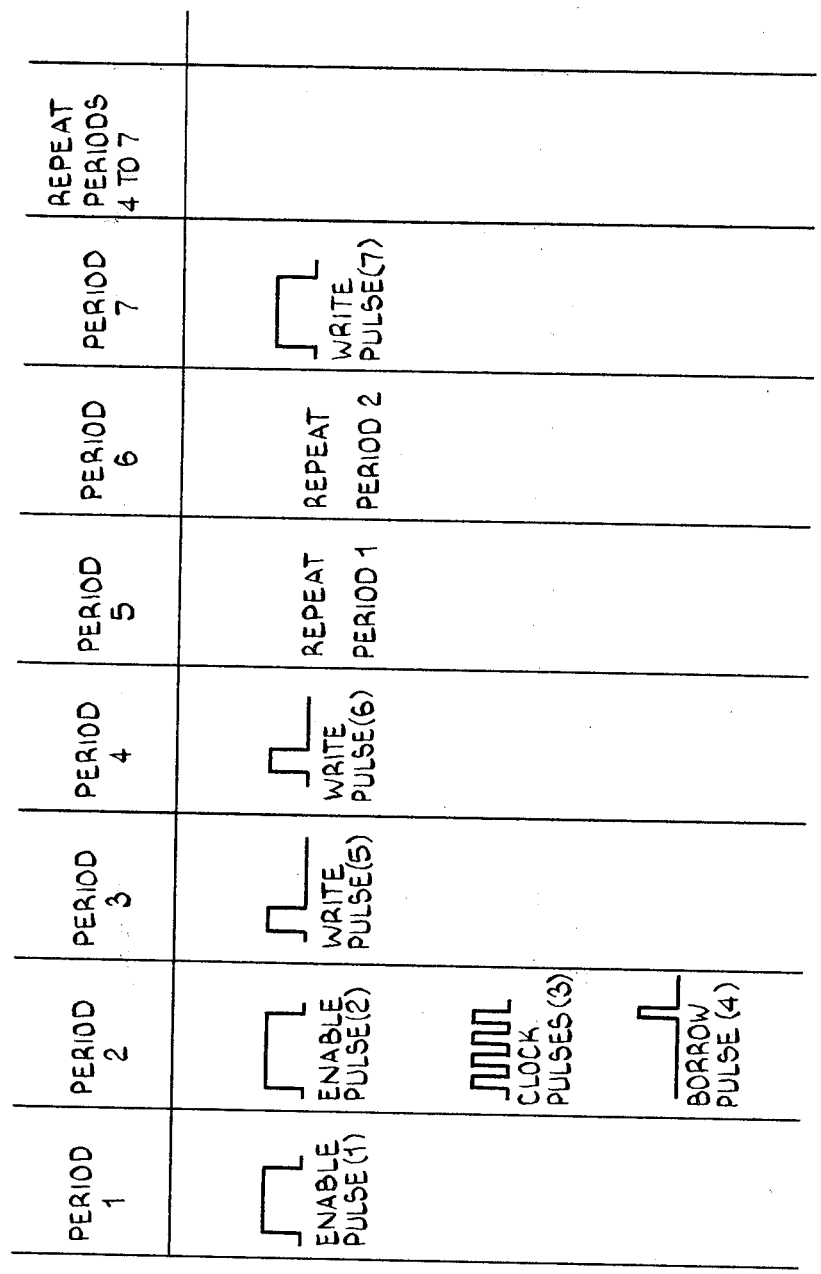
FIG. 3 is a timing diagram associated with FIG. 2.

FIGS. 2 and 3 illustrate the organisation and mode of operation of part of FIG. 1 in greater detail so as to indicate the simplicity with which it can be implemented. In particular, the sequence of events which represent the operation of the four stores 8, 9, 12 and 13 is shown in conjunction with the master clock 11 which includes a sequence controller 11a which produces the waveforms shown in FIG. 3. The first store 8 comprises a reversible up/down counter 8a having an up clock input connected to a gate 8b. This gate enables clock pulses applied to it, so that the counter 8a counts up at the appropriate times as required. The second store 9 contains a similar configuration consisting of a counter 9a and in this case two gates 9b and 9c.

The third store 12 comprises a memory 12a into which information can be written in parallel. The counters 8a and 9a can be conveniently constituted by a reversible up/down counter of the kind manufactured by Texas Instruments type number SN 54193.

The sequence of events described previously in connection with FIG. 1 can conveniently be divided into the seven sequential periods illustrated in FIG. 3. Before the lock button is operated, and while the receiver is being tuned, counters 8a, 9a and remainder store 13 are reset to zero by a reset pulse from controller 11a. Period 1 is initiated when the lock button 10 is operated. At this time the receiver is correctly tuned and it is necessary to obtain an accurate measure of the current difference in frequency between the two oscillators 5 and 6, so that the difference value can be used subsequently to correct for any frequency drift occurring in one oscillator relative to the other oscillator. During period 1, gates 8b and 9b are enabled by means of an enable pulse (1) from controller 11a, so that counters 8a and 9a count upwards during a time determined by the length of the enable pulse. At the end of the enable pulse, each counter 8a and 9a contains a count which is indicative of the frequency $f_1$ and $f_2$ of oscillators 5 and 6 respectively.

During period 2, the count held in counter 9a is subtracted from that held in counter 8a to leave a count representative of the difference between the two frequencies of oscillators 5 and 6. Gate 9c receives an enable pulse (2) from the controller 11a and also clock pulses (3) generated internally within the controller 11a. These clock pulses are transferred via gate 9c to counters 8a and 9a, both of which count downwardly by the same amount, and the period 2 ends when counter 9a produces a borrow pulse (4), which indicates that its count content has reached zero. This borrow pulse (4) is applied to gate 9c which is then disabled, and the downwards counting of 8a and 9a is inhibited.

During period 3 the difference count now remaining in counter 8a is transferred to the memory 12a over parallel lines, by applying a short write pulse (5) to the memory 12a from the controller 11a, so that the contents of counter 8a are written in to the memory.

Subsequently, during period 4, the complement of this count is entered directly into counter 8a over parallel lines by the action of a write pulse (6) from controller 11a, without erasing or modifying the information already held in memory 12a. This has the effect of entering into 8a a negative count corresponding to the difference in frequency between oscillators 5 and 6. Periods 1 and 2 are now repeated exactly, and are represented as periods 5 and 6 in FIG. 3. At the end of period 6 counter 8a contains a count, which will be zero if the relative frequencies of oscillators 5 and 6 have remained constant between periods 1 and 6. However, if either oscillators alters in frequency over this time, a remainder count will be present in counter 8a at the end of period 8 which will be indicative of the extent to which frequency drift has occurred.

During period 6, the remainder count is transferred to the remainder store 13 by means of a write pulse (7) applied to store 13 from controller 11a. The value then held in remainder store 13 is used as described previously to modify the frequency of the oscillator 6 to reduce the frequency error which has occurred.

Sequentially, periods 4 to 7 are repeated at regular intervals, so as to minimise the frequency drift which occurs. As mentioned previously a suitable interval is one second. Since the remainder store 13 will be up dated each second it contains a value which is representative of the frequency drift which has occurred during the preceding one second. Ideally no frequency drift occurs so that the remainder store 13 contains always a constant zero count which is indicative of a constant correct difference in frequency of oscillators 5 and 6.

We claim:

1. In a superheterodyne receiver having a plurality of local oscillators each associated with a frequency changer, the improvement which comprises means for determining a relationship between two of said oscillators to provide a control signal and means for utilising said control signal to control one of said oscillators so as to tend to maintain said relationship constant, said relationship being the difference frequency between said two of said oscillators, said means for determining comprising a first store provided to receive a count corresponding to the frequency of one of said two oscillators, a second store to receive a count corresponding to the frequency of the other of two oscillators, means for subtractively adding the count of said first and said second store and for transferring the resultant to a third store and means for subsequently transferring the count of said third store into said first store, for applying a count corresponding to the frequency of said one oscillator into said first store and a count corresponding to the frequency of said other oscillator into said second store, and means for subtractively adding the count then in said second store to the count then in said first store and transferring the remainder to a fourth store whose output is said control signal.

* * * * *